(12) United States Patent
Riley et al.

(10) Patent No.: US 7,795,746 B2
(45) Date of Patent: Sep. 14, 2010

(54) APPARATUS AND METHOD FOR GENERATING POWER FOR A LOW CURRENT DEVICE

(75) Inventors: Jim Riley, Rochester, NY (US); Steve Markham, Rochester, NY (US)

(73) Assignee: Robert Bosch GmbH, Stuttgart (DE)

( * ) Notice: Subject to any disclaimer, the term of this patent is extended or adjusted under 35 U.S.C. 154(b) by 202 days.

(21) Appl. No.: 12/113,376

(22) Filed: May 1, 2008

(65) Prior Publication Data
US 2009/0273322 A1 Nov. 5, 2009

(51) Int. Cl.
*G08B 13/08* (2006.01)
(52) U.S. Cl. .................................... 290/1 R; 340/545.1
(58) Field of Classification Search ................ 290/1 R
See application file for complete search history.

(56) References Cited

U.S. PATENT DOCUMENTS

| | | | |
|---|---|---|---|
| 1,624,656 A | | 4/1927 | Bryan, Jr. |
| 2,078,805 A | * | 4/1937 | Merrill .................. 310/156.08 |
| 3,553,510 A | * | 1/1971 | Howey .................. 310/156.72 |
| 4,433,355 A | | 2/1984 | Chew et al. |
| 4,912,460 A | | 3/1990 | Chu |
| 4,980,572 A | | 12/1990 | Sen |
| 5,193,647 A | | 3/1993 | O'Brien, II |
| 5,243,735 A | | 9/1993 | O'Brien, II |
| 5,317,303 A | * | 5/1994 | Ross et al. ............. 340/539.26 |
| 5,572,190 A | * | 11/1996 | Ross et al. .................. 340/541 |
| 5,896,026 A | | 4/1999 | Higgins |
| 6,038,895 A | | 3/2000 | Menke et al. |
| 6,236,118 B1 | | 5/2001 | Vasija et al. |
| 7,145,436 B2 | * | 12/2006 | Ichikawa et al. ........... 340/5.72 |
| 7,522,042 B2 | * | 4/2009 | Milo ....................... 340/545.1 |
| 7,571,515 B2 | * | 8/2009 | Fischbach et al. .............. 16/79 |
| 2007/0268132 A1 | * | 11/2007 | Milo ....................... 340/545.1 |
| 2008/0100152 A1 | * | 5/2008 | Busch .......................... 310/14 |
| 2009/0140858 A1 | * | 6/2009 | Gore et al. ................... 340/547 |
| 2009/0260289 A1 | * | 10/2009 | Carpenter et al. .............. 49/26 |

FOREIGN PATENT DOCUMENTS

| JP | 2004204533 A | * | 7/2004 |
|---|---|---|---|
| JP | 2004244882 A | * | 9/2004 |

* cited by examiner

*Primary Examiner*—Joseph Waks
(74) *Attorney, Agent, or Firm*—Taft Stettinius & Hollister LLP; Keith J. Swedo (57) ABSTRACT

A method for providing power to a low current electronic device includes pivotably coupling a door to a door frame. A rotating member of an alternating current generator is coupled to either the edge surface of the door or the door-facing surface of the door frame. A stationary member of an alternating current generator is coupled to an other of the edge surface of the door and the door-facing surface of the door frame. The door is pivoted toward an open position to thereby rotate the rotating member and generate an alternating current. The door is pivoted toward a closed position to thereby rotate the rotating member and generate an alternating current.

16 Claims, 8 Drawing Sheets

APPARATUS AND METHOD FOR GENERATING POWER FOR A LOW CURRENT DEVICE

BACKGROUND

1. Field of the Invention

The present invention relates to apparatuses and methods for providing power to a low current device.

2. Description of the Related Art

The operation of low current electrical devices, such as security sensors, requires a supply of low current electrical power. It is beneficial to employ a low cost, energy efficient source of energy for the operation of such low current electrical devices. Accordingly, present methods of powering such devices include the use of solar panels or vibration generators. Unfortunately, the productivity of solar panels depends on lighting conditions, which can be unpredictable. In addition, certain environments and regions have unfavorable lighting conditions, and therefore are not conducive to the operation of a solar panel. Vibration generators convert vibration energy to current. However, in some environments the amount of vibration is insufficient to yield sufficient current.

Electrical generators, such as those disclosed in U.S. Pat. Nos. 6,236,118 and 7,145,436, have been proposed that are designed to covert the energy of an opening door to electrical energy. However, these generators are typically cumbersome, complex and unsightly devices, and/or are designed to generate energy only when the door is opened.

It would be beneficial to have a convenient, efficient and compact apparatus and method for converting the kinetic energy of an opening and closing door into low current electrical energy.

SUMMARY

The present invention provides an alternating current generator including a rotor driven by the opening and closing of a door, and a stator fixed to the door frame. The generator may create current both when the door opens and when the door closes. The generator may provide power for recharging a battery that, in turn, powers a low current electrical device, such as a security sensor.

In one aspect, the present invention includes an electrical generator assembly for use with a door assembly. The door assembly includes a door frame having a jamb with a door-facing surface and a door hingedly coupled to the frame and having a jamb-facing surface. The door is pivotable between an open position and a closed position. The jamb-facing surface faces the door-facing surface when the door is in the closed position. The generator assembly includes an electrical generator including a first member and a second member. The second member is rotatable about an axis relative to the first member. A mounting plate is attached to the first member and adapted to be mounted on either the jamb or the door. A lever arm is coupled to the second member and adapted to be mounted on an other of the jamb and the door. The lever arm rotates the second member about the axis and thereby causes the second member to generate an alternating current when the door is pivoted toward the open position, and generate an alternating current when the door is pivoted toward the closed position.

In another aspect of the present invention, a method for providing power to a low current electronic device includes pivotably coupling a door to a door frame. A rotating member of an alternating current generator is coupled to either the edge surface of the door or the door-facing surface of the door frame. A stationary member of an alternating current generator is coupled to an other of the edge surface of the door and the door-facing surface of the door frame. The door is pivoted toward an open position to thereby rotate the rotating member and generate an alternating current. The door is pivoted toward a closed position to thereby rotate the rotating member and generate an alternating current.

In still another aspect, the present invention provides a security system for use in securing a structure having a door assembly. The door assembly includes a door frame having a door-facing edge and a door hingedly coupled to the frame and having a frame-facing edge. The door is moveable between an open position, wherein the frame-facing edge is spaced substantially apart from the door-facing edge, and a closed position, wherein the frame-facing edge is proximal the door-facing edge. The security system includes an electrical generator assembly operably mounted to the door assembly. The generator assembly includes a stationary member and a rotating member. The rotating member rotates relative to the stationary member. The rotating member causes the generation of alternating current when rotated relative to the stationary member. A mounting plate is coupled to the stationary member and is adapted to be mounted on the door-facing edge of the frame. A lever arm is coupled to the rotating member and is adapted to be mounted on the frame-facing edge of the door. The lever arm rotates the rotating member relative to the stationary member when the door is moved between the open and closed positions thereby causing the rotating member to generate the alternating current. An energy harvesting device is electrically coupled to the electrical generator assembly and receives the alternating current. A security sensor is electrically coupled to and powered by the energy harvesting device.

According to the present invention, a generator assembly may be mounted to a door assembly in order to convert the energy of the pivoting motion of a door into electrical energy that may be used to power a low current device. In addition, the mounting of a generator assembly to an edge surface of the door and to a surface of a door jamb takes advantage of the space between the door and the jamb, and allows for the convenient and inconspicuous mounting of the generator assembly.

An advantage of the present invention is that it has minimal installation requirements.

Another advantage is that the present invention is inexpensive to manufacture.

Yet another advantage is that the kinetic energy of a heavily-used door may be used to power a low current device in environments wherein there is insufficient light and vibration for use of a solar panel or a vibration-driven power source.

A further advantage is that current may be generated both when the door closes and when the door opens.

A still further advantage is that the invention may be integrated into the structure of a hinge such that it is not visible, or is inconspicuous, to a casual observer.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
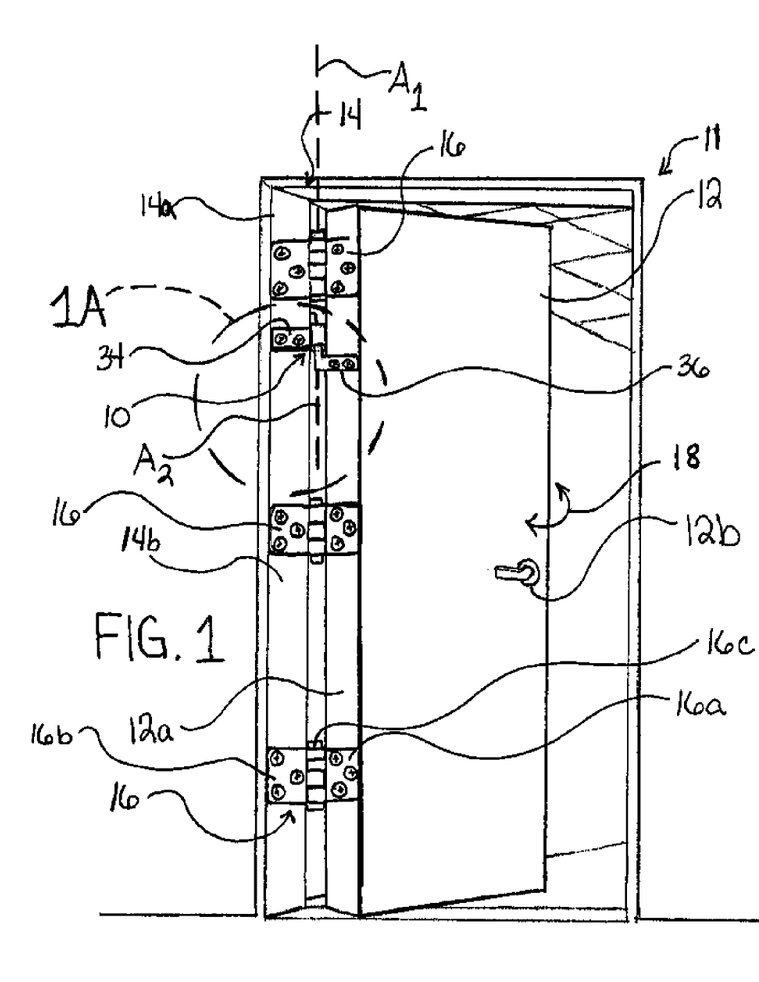
FIG. 1 is perspective view of a door assembly in an open position and equipped with an electrical generator assembly in accordance with one embodiment of the present invention.
Figure 1A:
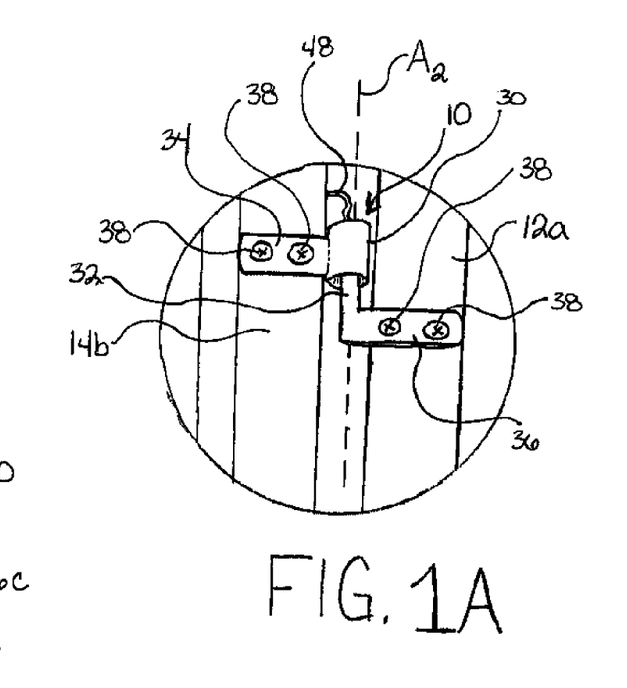
FIG. 1A is a enlarged view of the encircled region 1A in FIG. 1.

Referring first to FIGS. 1 and 1A, generator assembly 10 in accordance with one embodiment of the present invention is illustrated. Generator assembly 10 is operably mounted on door assembly 11. Door assembly 11 generally includes door frame 14 and door 12, which is pivotably mounted to door frame 14 by hinges 16. Door 12 includes, among other things, frame-facing edge surface 12a to which hinge 16 is coupled, and door handle 12b. Door frame 14 includes, among other things, jamb 14a, which includes door-facing edge surface 14b. Hinge 16 includes door mounting plate 16a, which is mounted to frame-facing edge surface 12a of door 12, and frame mounting plate 16b, which is mounted to door-facing edge surface 14b of frame 14. Door mounting plate 16a and frame mounting plate 16b are pivotably coupled to one another by pin 16c. Door 12 is pivotable relative to frame 14 and about axis $A_1$. Door 12 pivots between an open position, shown in FIG. 1, wherein frame-facing edge surface 12a is spaced apart from door-facing edge surface 14b, and a closed position, shown in FIG. 2, wherein frame-facing edge surface 12a may be aligned proximal to and parallel with door-facing edge surface 14b. Door 12 pivots in a first direction when moving from the closed position to the open position, and door 12 pivots in an opposite second direction when moving from the open position to the closed position, as indicated by double arrow 18.

Referring still to FIGS. 1 and 1A, generator assembly 10 generally includes stationary member 30 and rotating member 32. Rotating member 32 is in rotatable engagement with stationary member 30 such that rotating member 32 rotates relative to stationary member 30 and about axis $A_2$. Rotating member 32 and stationary member 30 cooperate with one another in a manner typical of alternating current generators to generate an alternating current when rotating member 32 rotates relative to stationary member 30. In fact, the rotating and stationary members 30, 32 of generator assembly 10 may be in the form of any generator assembly unit capable of generating alternating current from a rotating member. For instance, as is discussed in further detail below, generator assembly 10 may be in the form of an electromagnetic alternating current generator.

Figure 3:
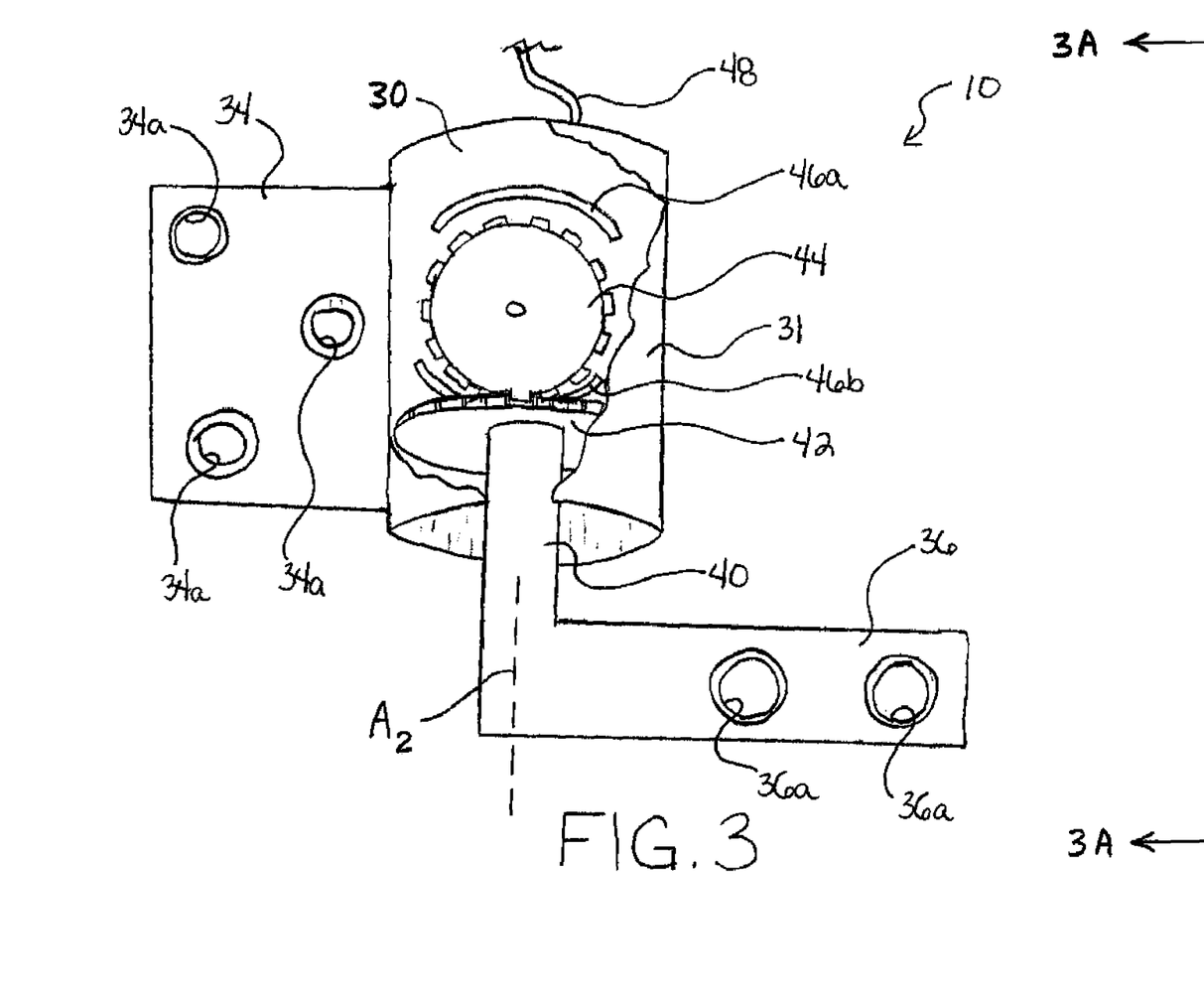
FIG. 3 is a front perspective, partial cut-away view of an electrical generator assembly in accordance with one embodiment of the present invention.

As illustrated in FIGS. 1 and 1A, generator assembly 10 is operably mounted to door assembly 11 via mounting plate 34 and lever arm 36. Mounting plate 34 is coupled at one end to stationary member 30 and at the other end to door frame edge surface 14b. As illustrated in FIGS. 1A and 3, to facilitate the mounting of mounting plate 34 to door frame edge 14b, mounting plate 34 includes fastener receiving openings 34a. Fastener receiving openings 34a are configured to receive fasteners 38, such as screws, nails, dowels or pins, therethrough to mount mounting plate 34 to door frame edge 14b. It should be understood that mounting plate 34 may be mounted to door frame edge surface 14b using any means including, for instance, fasteners, welding or adhesives. Mounting plate 34 also may be mounted to stationary member 30 using any means including, for instance, fasteners, welding or adhesives. Alternatively, mounting plate 34 may be integrally formed as one unit with stationary member 30.

Referring to FIGS. 1A and 3, lever arm 36 is coupled at one end to rotating member 32 and at the other end to frame-facing edge surface 12a of door 12. To facilitate the mounting of lever arm 36 to frame-facing edge surface 12a, lever arm 36 includes fastener receiving openings 36a through which fasteners 38, such as screws, nails, dowels or pins are received. It should be understood that lever arm 36 may be mounted to frame-facing edge 12a using any means including, for instance, fasteners, welding or adhesives. Lever arm 36 may be mounted to rotating member 32 using any means including, for instance, fasteners, welding or adhesives. Alternatively, lever arm 36 may be integrally formed as one unit with rotating member 32.

Referring back to FIGS. 1 and 1A, generator assembly 10 is mounted to door assembly 11, as discussed above, such that axes $A_1$ and $A_2$ are in alignment with one another. Accordingly, as door 12 is pivoted about axis $A_1$ between the open and closed positions, lever arm 36 is pivoted about axis $A_2$.

Figure 3A:
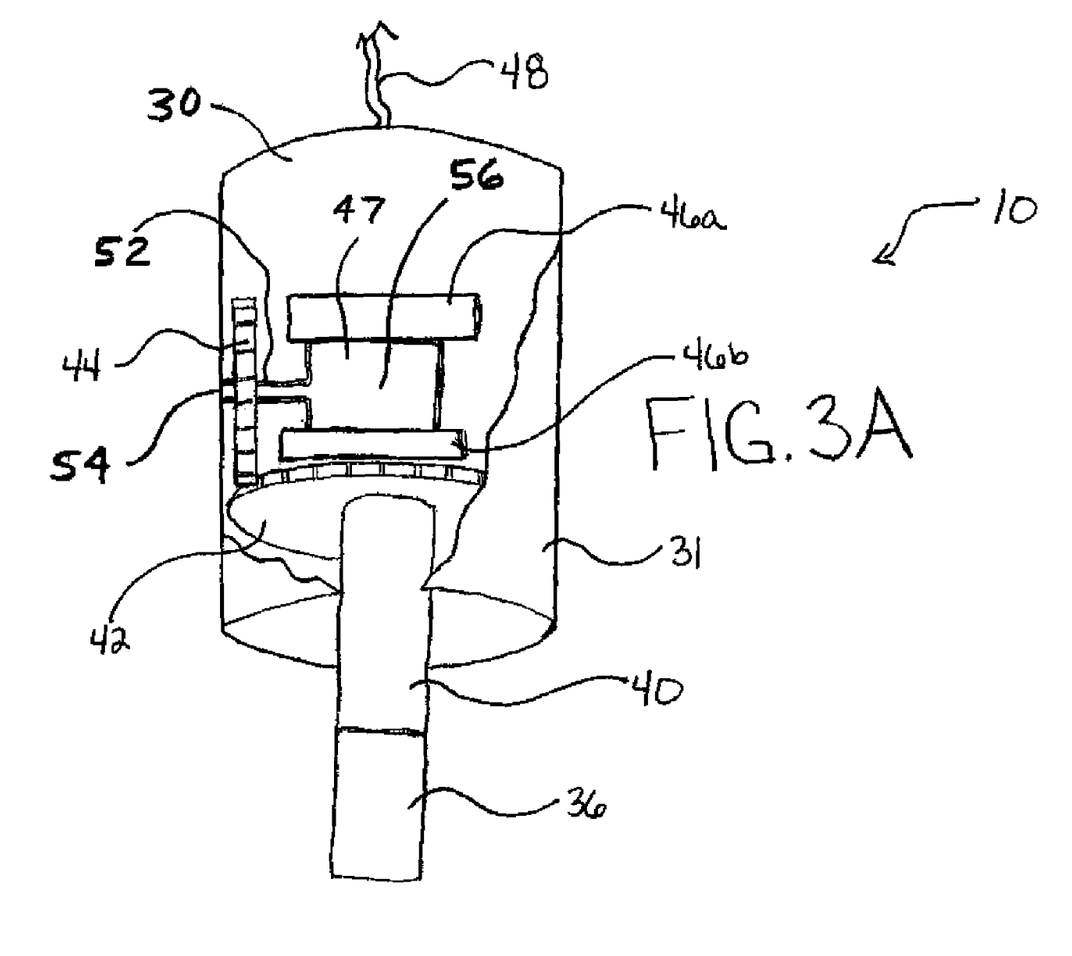
FIG. 3A is a side perspective, partial cut-away view of the electrical generator assembly of FIG. 3 along line 3A-3A.

Turning now to FIGS. 3 and 3A, generator assembly 10 is illustrated in more detail. Stationary member 30 (FIG. 1A) of generator assembly 10 includes housing 31, which is partially cut away in FIGS. 3 and 3A to illustrate the components inside housing 31. Mounting plate 34 is coupled to housing 31. Stationary member 30 also includes a pair of magnets 46a, 46b disposed within housing 31. Magnets 46a, 46b have opposing polarities and, thus, are configured to create a magnetic field therebetween.

Rotating member 32 (FIG. 1A) includes rotor 40 that is attached at one end to a proximal end of lever arm 36. The opposite end of rotor 40 is attached to first gear 42. In the embodiment shown, first gear 42 is horizontally oriented and second gear 44 is vertically oriented for ease of illustration. However, it is to be understood that, in other embodiments, both gears may be horizontally oriented, or both gears may be vertically oriented. First gear 42 is disposed within housing 31 and is adapted to rotate with rotor 40. Second gear 44 is disposed within housing 31 and is in operable and meshing engagement with first gear 42 such that the rotation of first gear 42 causes the rotation of second gear 44. As is illustrated in FIGS. 3 and 3A, second gear 44 may have a diameter that is smaller than the diameter of first gear 42. Because of its smaller diameter, second gear 44 may rotate at a greater rate of rotation relative to first gear 42. That is, the rotational speed of second gear 44 may be greater than the rotational speed of first gear 42. Accordingly, second gear 44 may step up the rotation generated by first gear 42.

Wire coil 47 is disposed within housing 31 and includes a shaft 52 attached at one end to second gear 44 for rotation therewith, and rotatably supported by housing 31, as indicated at 54. The opposing end of shaft 52 is attached to coil body 56. Body 56 is rotatably positioned between magnets 46a, 46b and in the magnetic field created by magnets 46a, 46b. Electrical conductor pair 48 extends from housing 31 and is electrically connected to wire coil 47. Electrical conductor pair 48 carries the alternating current created by generator assembly 10 to another device, as described in further detail below.

Referring now to FIGS. 1, 1A, 2, 3 and 3A, operation of generator assembly 10 will now be described. As a person moves door 12 in the first direction from the closed position, shown in FIG. 2, to the open position, shown in FIG. 1, door 12 pivots away from frame 14, thereby causing frame-facing edge surface 12a of door 12 to move away from door-facing edge surface 14b of frame 14. The movement of frame-facing edge surface 12a away from door-facing edge surface 14b causes lever arm 36, which is attached to frame-facing edge surface 12a, to pivot about axis $A_2$. As lever arm 36 pivots, lever arm 36 rotates rotor 40 about axis $A_2$ relative to housing 31 and relative to magnets 46a, 46b. The rotation of rotor 40 causes the rotation of first gear 42, which, in turn, causes the rotation of second gear 44. The rotation of second gear 44 causes coil 47 to rotate at a rate of rotation that is stepped up from that of first gear 42 and that matches the rotational speed of gear 44. Coil 47 rotates within the magnetic field created by stationary magnets 46a, 46b, thereby causing the generation of alternating current within coil 47 and conductors 48.

Figure 2:
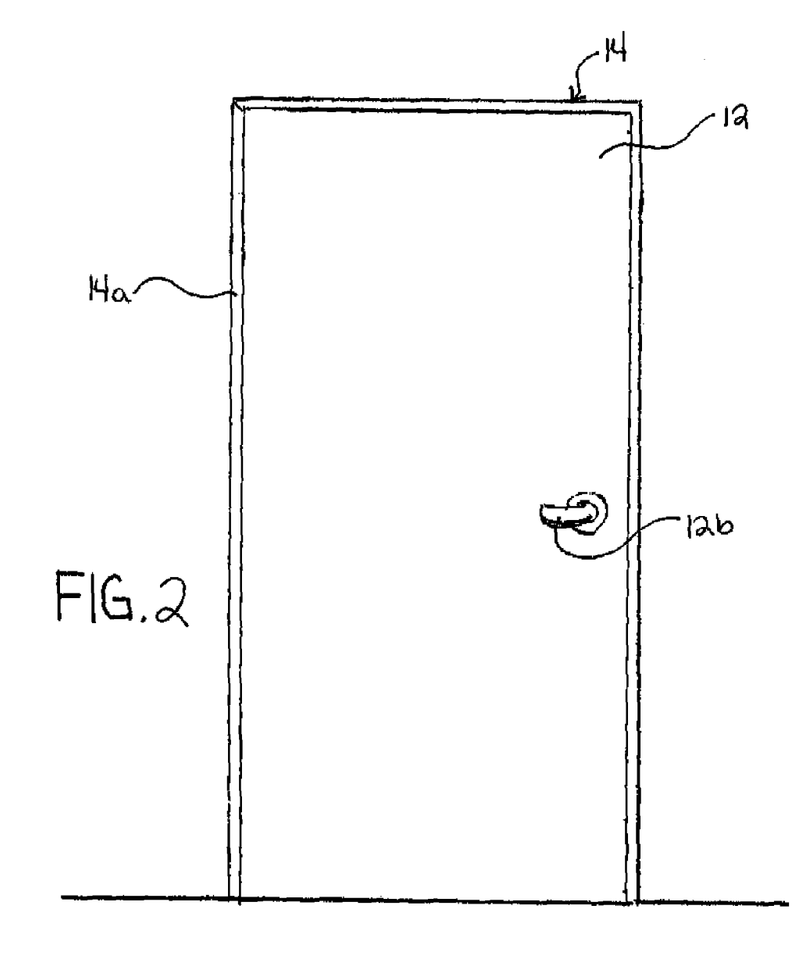
FIG. 2 is a perspective view of the door assembly in FIG. 1 in a closed position.

As door 12 is moved in the second direction from the open position to the closed position, lever arm 36 is pivoted about axis $A_2$ in the opposite direction. The pivoting of lever arm 36 causes the rotation of rotor 40 about $A_2$ in the opposite direction. The rotation of rotor 40 causes the rotation of first gear 42, which, in turn, causes the rotation of second gear 44 in the opposite direction. The rotation of second gear 44 causes coil 47 to rotate in the opposite direction at a rate of rotation that may be stepped up from that of first gear 42. Coil 47 rotates in the opposite direction within the magnetic field created by magnets 46a, 46b, thereby causing the generation of alternating current. Accordingly, alternating current is generated when the door moves in both the first direction and the second direction. The alternating current may be carried via conduit 48 to provide power to a device, as described below.

The operable mounting of generator assembly 10 to door assembly 11, as described above, takes advantage of the energy in the pivoting motion of a door and acts to convert the energy of the door motion into electrical energy. In addition, generator assembly 10 takes advantage of the space between door jamb surface 14a and frame-facing edge surface 12a of door 12 to inconspicuously mount generator assembly 10 to door assembly 11.

Figure 4:
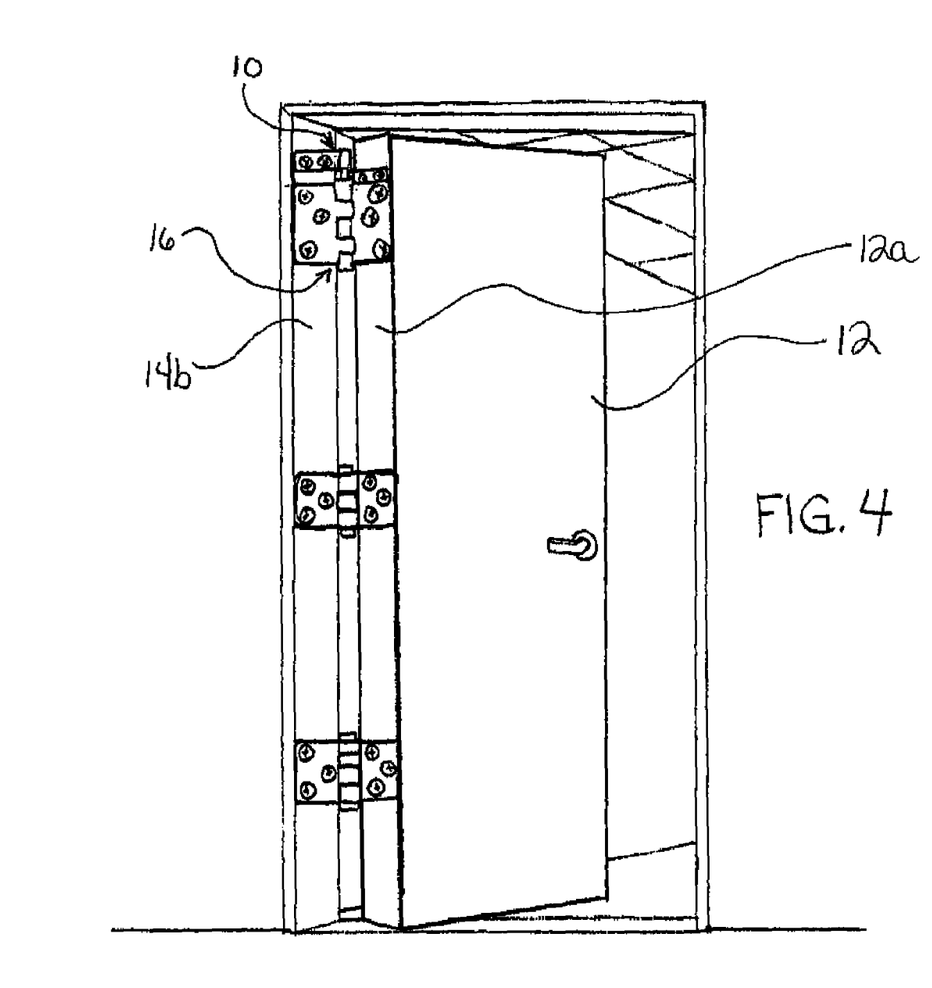
FIG. 4 is perspective view of a door assembly in an open position and equipped with an electrical generator assembly in accordance with another embodiment of the present invention.

It should be understood that the present invention contemplates other mounting arrangements. For instance, mounting plate 34 may be mounted on frame-facing edge surface 12a of door 12 and lever arm 36 may be mounted on door-facing edge surface 14b of frame 14. In this embodiment, member 30 is mounted to door 12 and is the rotating member, and member 32 is mounted to frame 14 and is the stationary member. In addition, as illustrated in FIG. 4, generator assembly 10 may be mounted at any position along the height of door assembly 11. For instance, generator assembly 10 may be mounted above top hinge 16. In addition, lever arm 36 and mounting plate 34 may be incorporated into mounting plates 16a, 16b of hinge 16 (FIG. 1).

Figure 5:
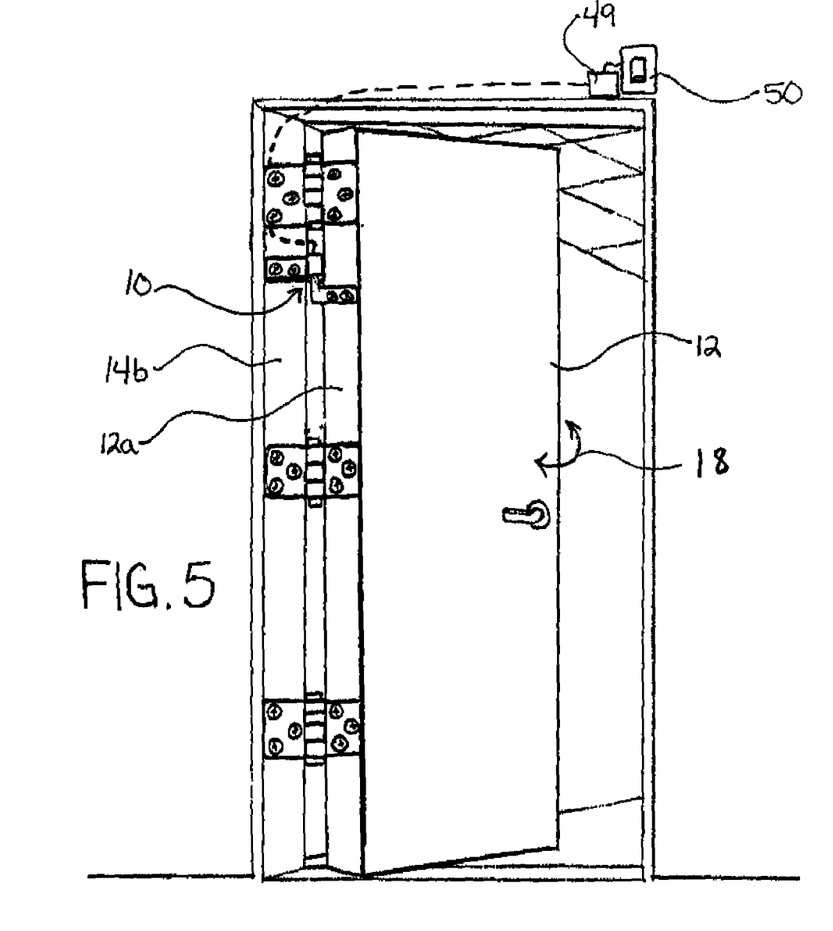
FIG. 5 is a perspective view of security system in operable relationship with a door assembly in accordance with an embodiment of the present invention.

Turning now to FIG. 5, a security system equipped with generator assembly 10 in accordance with the present invention is shown. The security system generally includes generator assembly 10, an energy harvesting device 49 electrically coupled (as illustrated by dashed line) to generator assembly 10, and a low current sensor device 50 electrically coupled to energy harvesting device 49. Energy harvesting device 49 may include an energy storage device that is recharged by the electrical current from generator assembly 10. More particularly, as door 12 is open and closed, generator assembly 10 generates alternating current as described above. The alternating current is transferred via a conduit (schematically illustrated by dashed line) to energy harvesting device 49. Energy harvesting device 49 may include a rectifier (not shown) that rectifies the alternating current for recharging an energy storage device such as a rechargeable battery (not shown). Energy storage device 49 then provides power to sensor device 50, which may be in the form of any sensor capable of detecting a person's presence near door 12. For instance, sensor device 50 may be a passive infrared sensor, vibration sensor or other type of motion sensor.

In the embodiment discussed above, coil 47 is coupled to door 12, and magnets 46a, 46b and housing 31 are attached to the fixed door frame. However, in another embodiment (not shown), it is possible for coil 47 to be coupled to the fixed door frame, and magnets 46a, 46b and housing 31 to be attached to the moving door. In this embodiment, Housing 31 rotates with door 12, and the coupling 54 of housing 31 and shaft 52 thereby causes gear 44 to rotatingly travel relative to gear 42. The rotation of gear 44 about shaft 52 translates into corresponding rotation of body 56, and the production of alternating current.

Figure 6:
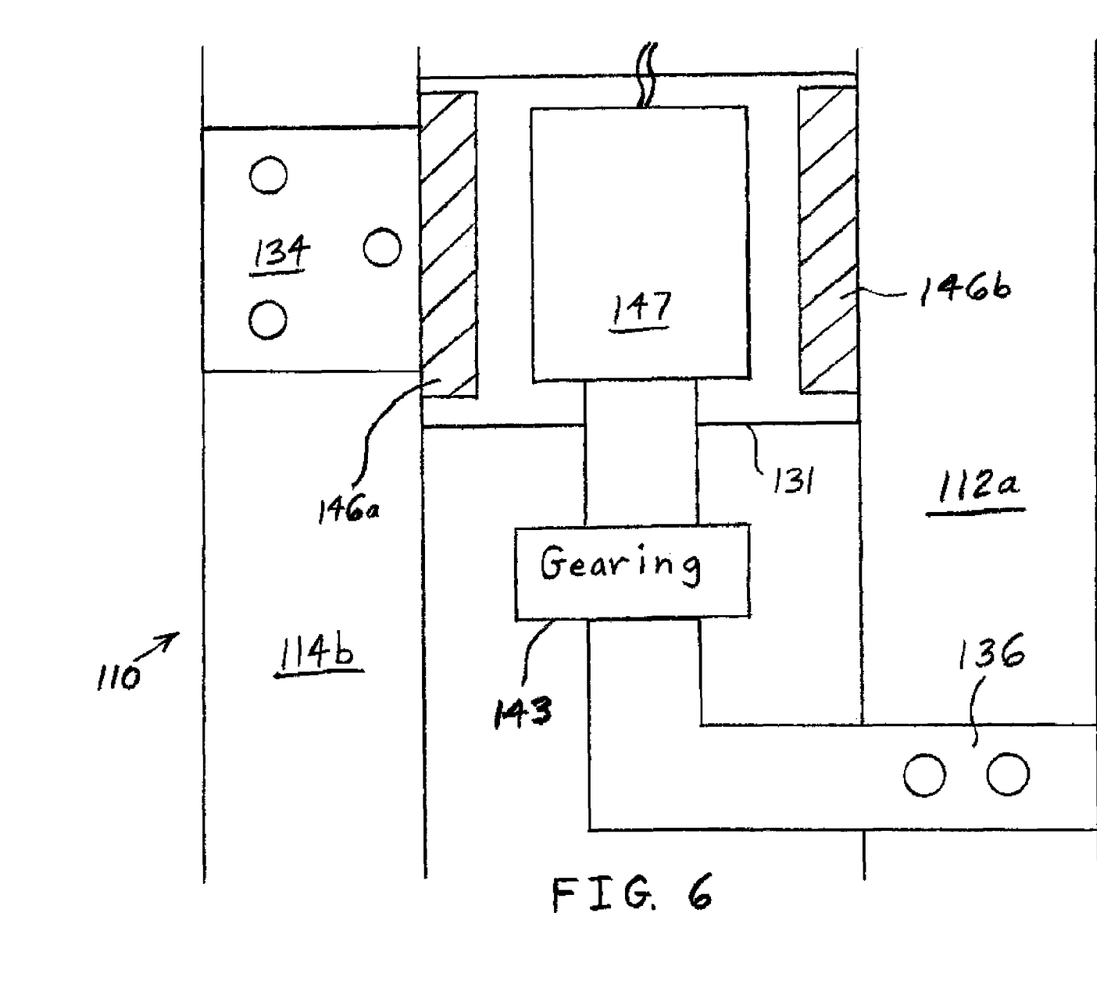
FIG. 6 is a side, sectional view of another embodiment of an electrical generator assembly mounted to a door and a door frame in accordance with the present invention.

It yet another embodiment, which is illustrated in FIG. 6, a generator assembly 110 includes a vertically-oriented wire coil 147 disposed between vertically-oriented magnets 146a, 146b. Lever arm 136 is attached to a door jamb-facing surface 112a of a door. Gearing 143 may be provided to increase the rotational speed of coil 147 above the rotation speed of lever arm 136 due to the pivoting door. Magnets 146a, 146b may be attached to a housing 131 that is attached, in turn, to a mounting plate 134. Mounting plate 134 may be attached to a door-facing edge surface 114b of a door jamb. Other features of generator assembly 110 are substantially similar to those of generator assembly 10, and thus are not discussed in detail herein.

Figure 7:
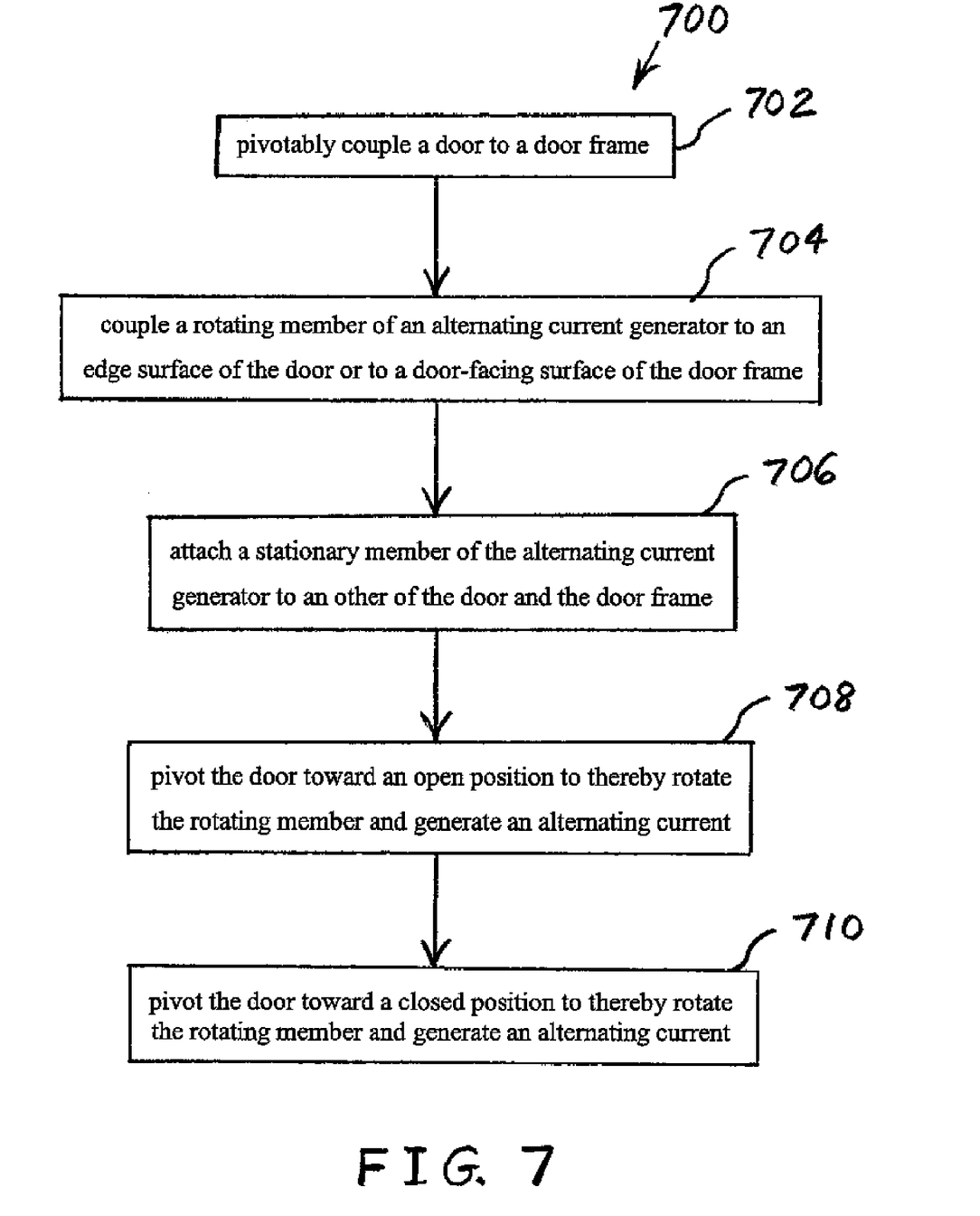
FIG. 7 is a flow chart of one method of the present invention for providing power to a low current device.

One embodiment of a method 700 of the present invention for providing power to a low power electronic device is illustrated in FIG. 7. In a first step 702, a door is pivotably coupled to a door frame. As shown in FIG. 1, door 12 may be pivotably coupled to door frame 14 via hinges 16 such that door 12 may pivot about hinges 16.

In a next step 704, a rotating member of an alternating current generator is coupled to an edge surface of the door or to a door-facing surface of the door frame. For instance, wire coil 47 of alternating current generator 10 may be coupled, via gears 42, 44, rotor 40 and lever arm 36, to frame-facing edge surface 12a of door 12, or to door-facing edge surface 14b of frame 14.

Next, in step 706, a stationary member of the alternating current generator is attached to an other of the door and the door frame. In the embodiment of FIGS. 1-3, stationary member 30 is attached to door frame edge surface 14b of door frame 14, but could alternatively be attached to frame-facing edge surface 12a of door 12.

In step 708, the door is pivoted toward an open position to thereby rotate the rotating member and generate an alternating current. More particularly, door 12 may be pivoted from the closed position of FIG. 2 to the open position of FIG. 1 to thereby rotate wire coil 47 about shaft 52 and generate an alternating current in conductor pair 48.

Finally, in step 710, the door is pivoted toward a closed position to thereby rotate the rotating member and generate an alternating current. More particularly, door 12 may be pivoted from the open position of FIG. 1 to the closed position of FIG. 2 to thereby rotate wire coil 47 about shaft 52 and generate an alternating current in conductor pair 48.

Method 700 may further include electrically coupling the alternating current generator to an energy harvesting device such that energy from the alternating current generated by the generator is stored in the energy harvesting device. That is, generator 10 may be coupled to energy harvesting device 49 such that the alternating current from generator 10 may recharge an energy storage device in energy harvesting device 49.

Further still, method 700 may include electrically coupling a security sensor to the energy harvesting device, and powering the security sensor with the energy stored in the energy harvesting device. For example, security sensor 50 may be powered by energy harvesting device 49.

The generator assembly of the present invention may be alternatively configured such that the coil is the stationary component and the magnets are rotated about the coil. In this embodiment, the coil may be attached to either the door or the door frame, and the magnets may be coupled to the other of the door and the door frame. As in other embodiments disclosed herein, gearing may or may not be provided to increase the rotational speed of the magnets above the rotational speed of the pivoting door. Possible configurations for such rotating-magnet embodiments are clear to those of skill in the art in view of the above disclosures, and thus are not graphically illustrated herein.

The generator assembly of the present invention has been presented herein, for ease of illustration, as being separate from, but aligned with, hinges 16. However, it may be appreciated by those of skill in the art that it is also possible to incorporate or integrate the generator assembly of the present invention into the hinge itself such that the generator assembly is not visible to a casual observer. For example, mounting plate 16a could be formed integrally with lever arm 36, and mounting plate 16b could be formed integrally with plate 34. In this embodiment, mounting pin 16c could be provided with a length such that an end of pin 16c does not interfere with generator assembly 10.

It is to be understood that other alternating current-generating components may be used rather than the coil-magnet components. Any components capable of converting a rotating or pivoting motion into alternating current may be used.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An electrical generator assembly for use with a door assembly, the door assembly including a door frame having a jamb with a door-facing surface and a door hingedly coupled to the frame and having a jamb-facing surface, the door being pivotable between an open position and a closed position, the jamb-facing surface facing the door-facing surface when the door is in the closed position, the generator assembly comprising:

an electrical generator including a first member and a second member, said first member including a magnetic field, said second member being rotatable about an axis relative to said first member, said second member including:
a rotor;
a first gear attached to said rotor for rotation therewith;
a second gear operably engaged with said first gear, said first gear being operable to rotate said second gear when said rotor rotates said first gear, said second gear having a greater rate of rotation relative to said first gear; and
a wire coil coupled to said second gear for rotation therewith, said wire coil being disposed in said magnetic field;
a mounting plate attached to said first member and adapted to be mounted on one of the jamb and the door; and
a lever arm fixed to said rotor and adapted to be mounted on an other of the jamb and the door, said lever arm being configured to rotate said second member about said axis and thereby cause said second member to generate an alternating current when said door is pivoted toward the open position, and generate an alternating current when said door is pivoted toward the closed position.

2. An electrical generator assembly for use with a door assembly, the door assembly including a door frame having a jamb with a door-facing surface and a door hingedly coupled to the frame and having a jamb-facing surface, the door being pivotable between an open position and a closed position, the jamb-facing surface facing the door-facing surface when the door is in the closed position, the generator assembly comprising:

an electrical generator including a first member and a second member, said second member being rotatable about an axis relative to said first member, said second member including:
a rotor;
a first gear attached to said rotor for rotation therewith;
a second gear operably engaged with said first gear, said first gear being operable to rotate said second gear when said rotor rotates said first gear, said second gear having a greater rate of rotation relative to said first gear; and
a pair of magnets coupled to said second gear for rotation therewith, said magnets being configured to create a magnetic field, said first member including a wire coil disposed in said magnetic field;
a mounting plate attached to said first member and adapted to be mounted on one of the jamb and the door; and
a lever arm fixed to said rotor and adapted to be mounted on an other of the jamb and the door, said lever arm being configured to rotate said second member about said axis and thereby cause said second member to generate an alternating current when said door is pivoted toward the open position, and generate an alternating current when said door is pivoted toward the closed position.

3. A method for providing power to a low current electronic device, the method comprising the steps of:
pivotably coupling a door to a door frame;
coupling a rotating member of an alternating current generator to one of an edge surface of the door and a door-facing surface of the door frame;
attaching a stationary member of the alternating current generator to an other of the edge surface of the door and the door-facing surface of the door frame;
pivoting the door toward an open position to thereby rotate said rotating member and generate an alternating current; and
pivoting the door toward a closed position to thereby rotate said rotating member and generate an alternating current.

4. The method of claim 3 wherein the rotating member comprises a rotor and the coupling step includes coupling the rotating member to the edge surface of a door, coupling one end of a lever arm to the rotor, and coupling an opposite end of the lever arm to the edge surface of the door.

5. The method of claim 4 wherein the stationary member includes a magnetic field, the rotating member further includes a wire coil coupled to the rotor, and the wire coil is disposed for rotation in the magnetic field.

6. The method of claim 4 wherein the step of coupling the rotating member to the edge surface of a door includes coupling the rotor to a first gear for rotation with the rotor, and operably engaging a second gear with the first gear, the first gear being operable to rotate the second gear when the rotor rotates the first gear, the second gear having a greater rotational speed than the first gear.

7. The method of claim 6 wherein the stationary member includes a magnetic field, the rotating member includes a wire coil coupled to the second gear for rotation therewith, and the wire coil is disposed in the magnetic field.

8. The method of claim 3 wherein the attaching step includes attaching the stationary member to the door-facing surface of the door frame, attaching one end of a mounting plate to the stationary member, and attaching an opposite end of the mounting plate to the door-facing surface of the door frame.

9. The method of claim 3 further comprising the step of electrically coupling the alternating current generator to an energy harvesting device such that energy from the alternating current generated by the generator is stored in the energy harvesting device.

10. The method of claim 9 further comprising the step of electrically coupling a security sensor to the energy harvesting device, the security sensor being powered by the energy stored in the energy harvesting device.

11. The method of claim 3 comprising the further steps of:
recharging a battery with the alternating current generated by the door being pivoted toward the open position; and
recharging the battery with the alternating current generated by the door being pivoted toward the closed position.

12. The method of claim 11 comprising the further step of using the battery to power a security sensor.

13. A security system for use in securing a structure having a door assembly, the door assembly including a door frame having a door-facing edge and a door hingedly coupled to the frame and having a frame-facing edge, the door being moveable between an open position, wherein the frame-facing edge is spaced substantially apart from the door-facing edge, and a closed position, wherein the frame-facing edge is proximal the door-facing edge, the security system comprising:
an electrical generator assembly configured to be operably mounted to the door assembly, the generator assembly including:
a stationary member and a rotating member, said rotating member being rotatable relative to said stationary member, said rotating member being configured to generate alternating current when the rotating member is rotated relative to said stationary member;
a mounting plate coupled to said stationary member and adapted to be mounted on the door-facing edge of the frame; and
a lever arm coupled to said rotating member and adapted to be mounted on the frame-facing edge of the door, said lever arm being configured to rotate said rotating member relative to said stationary member when said door is moved between the open and closed positions thereby causing said rotating member to generate said alternating current;
an energy harvesting device electrically coupled to said electrical generator assembly and receiving said alternating current; and
a security sensor electrically coupled to and powered by said energy harvesting device.

14. The security system of claim 13 further comprising gearing coupling the lever arm to the rotating member.

15. The security system of claim 13 wherein the generator assembly is formed integrally into a door hinge configured to pivotably couple the door to the door frame.

16. The security system of claim 13 wherein said rotating member comprises a rotor fixed to said lever arm and a first gear attached to said rotor for rotation therewith, said rotating member further comprising a second gear operably engaged with said first gear, said first gear operable to rotate said second gear when said rotor rotates said first gear, said second gear having a greater rate of rotation than said first gear.

* * * * *